Aug. 23, 1932.　　　F. VAN NIEUWENHUYZEN　　　1,872,852
RAKE
Filed March 21, 1930
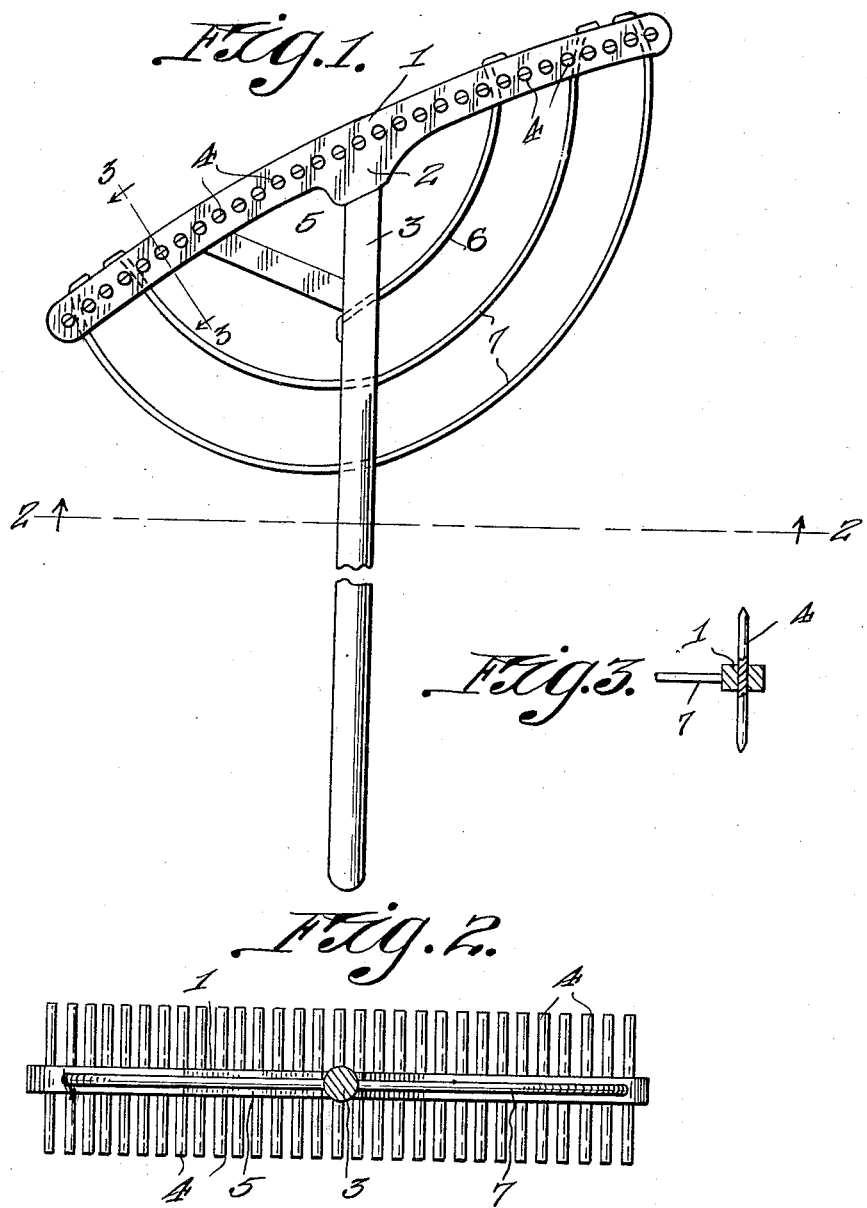

Patented Aug. 23, 1932

1,872,852

UNITED STATES PATENT OFFICE

FRED VAN NIEUWENHUYZEN, OF PELLA, IOWA

RAKE

Application filed March 21, 1930. Serial No. 437,824.

This invention relates to rakes and has as one of its objects to provide a rake which may be moved by the user, over the ground surface, by pushing upon the handle of the rake, the head of the rake being so formed that the cut grass and weeds and other debris will be delivered at one side of the rake head, so that the user of the rake may walk upon cleared soil.

Another object of the invention is to provide a hand rake so constructed that the user may walk substantially erect while using the same and not be required to bend over as is customary in the use of ordinary rakes.

This invention also consists in certain other features of construction and in the combination and arrangement of the several parts, to be hereinafter fully described, illustrated in the accompanying drawing, and specifically pointed out in the appended claim.

In describing my invention in detail, reference will be had to the accompanying drawing wherein like characters denote like or corresponding parts throughout the several views, and in which:—

Figure 1 is a plan view of the rake embodying the invention.

Figure 2 is a vertical transverse sectional view on the line 2—2 of Figure 1, looking in the direction indicated by the arrows.

Figure 3 is a vertical sectional view taken substantially on the line 3—3 of Figure 1, looking in the direction indicated by the arrows.

The rake embodying the invention comprises a head 1 preferably of wood and having an arcuate form, shown in Figure 1 of the drawing and the head is provided at its rear side with a stock 2, which is disposed at an angle to the rear curved edge of the head and into which is fitted a handle, indicated by the numeral 3, the handle extending on a line chordal to the arcuate line of extent of the said head 1. The teeth of the rake are of metal and indicated by the numeral 4 and the said teeth are double pointed, or, in other words, are tapered to a point at each end and are driven through the head 1 so that their intermediate portions are anchored in the head, the teeth being arranged in a series extending longitudinally of the head and projecting, of course, from both sides thereof, so that the rake may be employed in position with the head curved rearwardly to the left or to the right as may be found desirable.

In order that the head of the rake may be braced with respect to the handle a triangular wooden brace 5 is secured at one end to the rear side of the head at one side of the handle, and at its other end to the corresponding side of the handle.

Another bracing member 6 is also provided and consists of a piece of wood bent to arcuate form and having one end fitted forwardly through an opening in the head 1 at that side of the handle opposite the side at which the brace 5 is located, the other end of the brace 6 being fitted through an opening in the handle and the two ends of the brace being bent to engage against the parts through which they are secured. The head is further braced, with respect to the handle by other braces 7, which are likewise of wire and of arcuate form, and each of these braces is formed from a single length of wire which is fitted at its intermediate portion in an opening in the handle 3 and has its ends fitted through openings in the head 1 near the ends of said head and overturned against the forward side of the head, so as to be anchored, the braces 6 and 7 being preferably substantially concentrically arranged.

What I claim is:—

A rake having a head bar curved longitudinally and provided at its inner side and at a point approximately midway between its ends with a stock portion, a handle having an end inserted in the stock portion, said handle being disposed at an acute angle to the head bar and coplanar therewith, teeth passing transversely through the head bar and having end portions at the opposite sides thereof, said teeth being at right angles to the plane of the head bar and handle and brace rods passing transversely through the handle and having end portions passing transversely through the head bar at the opposite side of the stock portion thereof.

In testimony whereof I affix my signature.

FRED van NIEUWENHUYZEN.